US012492588B2

(12) United States Patent
Liang et al.

(10) Patent No.: US 12,492,588 B2
(45) Date of Patent: Dec. 9, 2025

(54) DAMPER ASSEMBLY

(71) Applicant: FOSHAN TIANSI HARDWARE CO., LTD, Guangdong (CN)

(72) Inventors: Peiling Liang, Guangdong (CN); Yelin Liang, Guangdong (CN); Qingjun Lao, Guangdong (CN); Haihui Zhu, Guangdong (CN)

(73) Assignee: FOSHAN TIANSI HARDWARE CO., LTD, Foshan (CN)

( * ) Notice: Subject to any disclaimer, the term of this patent is extended or adjusted under 35 U.S.C. 154(b) by 450 days.

(21) Appl. No.: 17/939,942

(22) Filed: Sep. 7, 2022

(65) Prior Publication Data

US 2023/0003069 A1 Jan. 5, 2023

Related U.S. Application Data

(63) Continuation of application No. PCT/CN2021/080372, filed on Mar. 12, 2021.

(30) Foreign Application Priority Data

Mar. 25, 2020 (CN) ......................... 202010216699.0
Apr. 7, 2020 (CN) ......................... 202010263822.4
(Continued)

(51) Int. Cl.
*E05F 5/00* (2017.01)
*A47B 88/473* (2017.01)
(Continued)

(52) U.S. Cl.
CPC ............ *E05F 5/003* (2013.01); *A47B 88/473* (2017.01); *E05F 3/02* (2013.01); *E05F 5/027* (2013.01);
(Continued)

(58) Field of Classification Search
CPC ... A47B 88/467; A47B 88/477; A47B 88/473; A47B 2210/0018; A47B 2210/0094;
(Continued)

(56) References Cited

U.S. PATENT DOCUMENTS 8,393,114 B2 * 3/2013 Haab ........................ E05F 5/003 16/98
8,540,328 B2 * 9/2013 Chen ....................... A47B 88/57 312/333
(Continued)

FOREIGN PATENT DOCUMENTS

CN 101076274 A 11/2007
CN 212465424 U 2/2021
(Continued)

OTHER PUBLICATIONS

International Search Report of PCT Patent Application No. PCT/CN2021/080372 issued on Jun. 7, 2021.

*Primary Examiner* — Jeffrey O'Brien

(57) ABSTRACT

A damper with hidden rail, comprising a shell and a damper, the damper comprises a tension piece, a sliding block, a telescopic cylinder and a limiting piece, the sliding block is slidably mounted in the shell, and the tension piece is connected to the shell and the sliding block; the tension piece is capable of pulling the sliding block to move; the limiting piece is connected to the sliding block, and the telescopic cylinder is mounted on the shell; the limiting piece is provided with a compression surface, one end of telescopic cylinder abuts against the compression surface directly or indirectly, and the telescopic cylinder and the limiting piece have a first relative position and a second relative position; in the process that the tension piece pulls the sliding block, the telescopic cylinder moves; and in the
(Continued)

process that the telescopic cylinder moves, the telescopic cylinder is gradually compressed.

1 Claim, 13 Drawing Sheets

(30) Foreign Application Priority Data

May 28, 2020 (CN) ......................... 202010466917.6
Jul. 14, 2020 (CN) ......................... 202010672141.3

(51) Int. Cl.

*A47B 88/477* (2017.01)
*E05F 3/02* (2006.01)
*E05F 5/02* (2006.01)
*E05F 5/10* (2006.01)

(52) U.S. Cl.

CPC .............. *E05F 5/10* (2013.01); *A47B 88/477* (2017.01); *A47B 2210/0018* (2013.01); *A47B 2210/0094* (2013.01); *A47B 2220/13* (2013.01)

(58) Field of Classification Search

CPC ........ A47B 2220/13; E05F 5/003; E05F 3/02; E05F 5/10; E05F 5/027
See application file for complete search history.

(56) References Cited

U.S. PATENT DOCUMENTS

| | | | | |
|---|---|---|---|---|
| 8,876,230 | B2 * | 11/2014 | Lowe | A47B 88/49 312/319.1 |
| 9,677,807 | B2 * | 6/2017 | Shin | A47B 88/473 |
| 9,995,078 | B2 * | 6/2018 | Ishikawa | E05F 5/08 |
| 10,087,670 | B2 * | 10/2018 | Grabher | A47B 88/40 |
| 10,428,872 | B2 * | 10/2019 | Kuribayashi | F16C 29/00 |
| 2006/0113169 | A1 * | 6/2006 | Leon | A47B 88/467 200/5 R |
| 2016/0076293 | A1 * | 3/2016 | Halfon | E05D 15/0652 16/90 |

FOREIGN PATENT DOCUMENTS

| | | | |
|---|---|---|---|
| CN | 212478889 | U | 2/2021 |
| DE | 102004037120 | A1 | 3/2006 |

* cited by examiner

DAMPER ASSEMBLY

CROSS REFERENCE TO RELATED APPLICATIONS

The present application is a Continuation Application of PCT Application No. PCT/CN2021/080372 filed on Mar. 12, 2021, which claims the benefit of Chinese Patent Application Nos. 202010216699.0 filed on Mar. 25, 2020, 202010263822.4 filed on Apr. 7, 2020, 202010466917.6 filed on May 28, 2020 and 202010672141.3 filed on Jul. 14, 2020. All the above are hereby incorporated by reference in their entirety.

FIELD OF THE INVENTION

The present invention relates to a damper, and in particular to a damper assembly.

BACKGROUND OF THE INVENTION

As a device capable of providing a motion resistance, the damper has the functions of energy absorption and shock absorption. Therefore, in order to reduce the excessive noise caused by collision in the closing process of drawers, doors and windows, damper structures are usually arranged on the sliding rails of the drawers, doors and windows. The conventional dampers need to be equipped with springs and air cylinders with the same length. The air cylinder can be slowly compressed in the contraction process of the spring, so that the drawers, doors and windows can be closed slowly. However, since the length of the air cylinder needs to be matched with the spring, the air cylinder is excessively long, which will occupy a large space of the sliding rail, resulting in a large size of the sliding rail.

SUMMARY OF INVENTION

The present invention provides a damper assembly, so as to reduce the size of a telescopic cylinder.

The present invention provides a damper assembly, comprising a tension piece, a sliding block, a telescopic cylinder and a limiting piece, wherein the sliding block is slidably mounted in the shell, and the tension piece is connected to the shell and the sliding block; the sliding block has a first position and a second position in the shell, and the tension piece is capable of pulling the sliding block to move from the first position to the second position;

- the limiting piece is connected to the sliding block, and the telescopic cylinder is mounted on the shell; or
- the telescopic cylinder is mounted on the sliding block, and the limiting piece is mounted on the shell;
- the limiting piece is provided with a compression surface, one end of the telescopic cylinder abuts against the compression surface directly or indirectly, and the telescopic cylinder and the limiting piece have a first relative position and a second relative position; in the process that the tension piece pulls the sliding block to move from the first position to the second position, the telescopic cylinder moves from the first relative position to the second relative position; and in the process that the telescopic cylinder moves from the first relative position to the second relative position, the telescopic cylinder is gradually compressed.

Further, the shell is a rail; a damper body is arranged at at least one end of the rail; the sliding block is slidably mounted on the rail; the sliding block has a first position and a second position on the rail; the tension piece is capable of pulling the sliding block to move from the first position to the second position; the limiting piece is a limiting rail; the telescopic cylinder is slidably mounted on the limiting rail, and the telescopic cylinder has a first limiting position and a second limiting position on the limiting rail; the compression surface is a side wall, the limiting rail is provided with at least one side wall forming an included angle with the direction of the rail, and the side wall forming an included angle with the direction of the rail inclines towards the telescopic cylinder from the first limiting position to the second limiting position; in the process that the sliding block slides from the first position to the second position, the sliding block drives the telescopic cylinder to move from the first limiting position to the second limiting position; and in the movement process, one end of the telescopic cylinder abuts against the side wall forming an included angle with the direction of the rail.

Further, the shell is a rail; a damper body is arranged at at least one end of the rail; the damper body further comprises an abutting piece; the sliding block is slidably mounted on the rail; the sliding block has a first position and a second position on the rail; the tension piece is capable of pulling the sliding block to move from the first position to the second position; the limiting piece is a limiting rail, the limiting rail is arranged on the sliding block, the compression surface is a side wall, and the limiting rail is provided with at least one side wall forming an included angle with the direction of the rail; the telescopic cylinder is mounted on the rail; the rail is provided with an abutting groove; the abutting piece is slidably mounted in the abutting groove; the telescopic cylinder abuts against the side wall, forming an included angle with the direction of the rail, of the limiting rail through the abutting piece; an inclination angle is formed between the abutting groove and the side wall, forming an included angle with the direction of the rail, of the limiting rail, and an inclination angle is formed between the abutting groove and the rail; the abutting piece has a first abutting position and a second abutting position at the abutting groove; in the process that the sliding block slides from the first position to the second position, the sliding block drives the abutting piece to slide from the first abutting position to the second abutting position; the abutting piece compresses the telescopic cylinder in the sliding process; and the length of a projection of the abutting groove in the direction of the rail is less than the length of the limiting rail.

Further, the damper comprises a damping piece; the damping piece is slidably mounted in the shell, and the damping is connected with the sliding block; the tension piece is connected to the shell and the damping piece; the damping piece has a first position and a second position in the shell; the tension piece is capable of pulling the damping piece to move from the first position to the second position; the damping piece comprises a limiting piece and a telescopic cylinder; a limiting groove is arranged in the limiting piece; the telescopic cylinder is slidably mounted in the limiting groove; the telescopic cylinder has a first limiting position and a second limiting position in the limiting groove; in the process that the telescopic cylinder moves from the first limiting position to the second limiting position, at least one end of the telescopic cylinder abuts against a side wall of the limiting groove and is compressed; the shell is further provided with a guide groove; the telescopic cylinder is slidably connected to the guide groove; an included angle is formed between the guide groove and a movement direction of the damping piece; when the damping piece is at the first position, the telescopic cylinder is located at the first limiting position; and when the damping piece is at the second position, the telescopic cylinder is located at the second limiting position.

Further, a compression stroke of the telescopic cylinder is less than a sliding stroke of the sliding block from the first position to the second position.

Further, an inclination angle is formed between the telescopic cylinder and the compression surface, and one end of the telescopic cylinder abuts against the compression surface.

Further, a contact piece is arranged at one end of the telescopic cylinder, and the telescopic cylinder abuts against the compression surface through the contact piece.

Further, the contact piece is further provided with a ball, and the contact piece abuts against the compression surface through the ball.

Further, the damper further comprises a sliding guide piece; the shell is provided with a sliding groove; one end of the sliding guide piece is inserted into the sliding groove; the telescopic cylinder abuts against the compression surface through the sliding guide piece; the sliding groove comprises a first sliding groove portion and a second sliding groove portion; and the first sliding groove portion is connected to one end of the second sliding groove portion.

Further, the first sliding groove portion and the second sliding groove portion are each of a straight groove structure; the first sliding groove portion is in bent connection with the second sliding groove portion; the limiting piece is connected to the sliding block; the telescopic cylinder is mounted on the shell; the first sliding groove portion is located at the compression surface, and an inclination angle is formed between an extending direction of the first sliding groove portion and the compression surface; an extending direction of the second sliding groove portion is the same as a compression direction of the telescopic cylinder; and in the process that the sliding block moves from the first position to the second position, a crossed position of the first sliding groove portion and the compression surface moves towards the second sliding groove portion.

Further, the sliding guide piece comprises a first sliding end and a second sliding end; the first sliding end and the second sliding end are inserted into the sliding groove; the sliding guide piece abuts against the telescopic cylinder through the second sliding end; and the sliding guide piece abuts against the compression surface through the first sliding end.

Further, a plurality of sliding guide pieces are provided, and all the sliding guide pieces are slidably connected to the sliding groove.

Further, the damper further comprises a shifting block; the shifting block is mounted on the sliding block; the shifting block is rotatably connected to the sliding block; the shell is provided with a first clamping piece; the shifting block is provided with a second clamping piece; and when the damping piece is located at the first position, the shifting block is capable of realizing clamping between the first clamping piece and the second clamping piece through rotation.

Compared with the prior art, the present invention has the following advantages that: the limiting piece is provided, so that a force generated when the telescopic cylinder is compressed can be converted into a resistance of the damper in the sliding process from the first position to the second position, thereby achieving a damping effect; meanwhile, due to the action of the limiting piece, the telescopic direction of the telescopic cylinder can be different from the movement direction of the damper, thereby avoiding the requirement of the traditional damper on the size of the air cylinder, reducing the space occupied by the damping piece and reducing the size of the damping structure; and since the size of the air cylinder is small, the cost of the damper is reduced.

DETAILED DESCRIPTION OF ILLUSTRATED EMBODIMENTS

Figure 1:
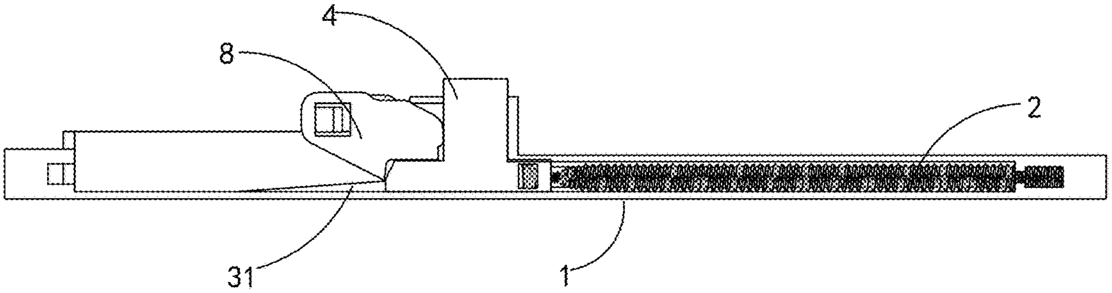
FIG. 1 is a front-view structural schematic diagram of an embodiment according to a first aspect of the present invention.

To make persons skilled in the art better understand the present invention, the technical solutions in the embodiments of the present invention will be described clearly and completely below. Apparently, the described embodiments are merely some rather than all of the embodiments of the present invention.

1. shell; 2. tension piece; 31. limiting piece; 311. compression surface; 32. telescopic cylinder; 4. sliding block; 111. straight groove portion; 112. bent portion; 12. sliding piece; 121. guide piece; 1211. guide groove; 321. contact piece; 41. limiting portion; 42. arc-shaped hole; 5. fixator; 6. sliding guide piece; 71. first sliding groove portion; 72. second sliding groove portion; 8. shifting block; 82. first clamping piece; 81. second clamping piece; 16. abutting groove; 24. abutting piece; 13. fixed piece; 2221. contact surface; 2222. conical clamping piece; 233. conical clamping groove; 14. horizontal groove; 3112. kidney-shaped hole; 322. fixing sleeve; 3221. guide column; 9. telescopic rail; 91. outer rail; 92. inner rail; 11. sliding groove; 312. limiting groove; 3111. limiting sliding groove.

First Aspect

According to a first aspect of the present invention, an embodiment of a damper assembly is provided. As shown in FIG. 1 to FIG. 12, the damper assembly comprises a shell 1 and a damper body, wherein the damper body comprises a tension piece 2, a sliding block 4, a telescopic cylinder 32 and a limiting piece 31, the sliding block 4 is slidably mounted in the shell 1, and the tension piece 2 is connected to the shell 1 and the sliding block 4; the sliding block 4 has a first position and a second position in the shell 1, and the tension piece 2 is capable of pulling the sliding block 4 to move from the first position to the second position;

the limiting piece 31 is connected to the sliding block 4, and the telescopic cylinder 32 is mounted on the shell 1; or the telescopic cylinder 32 is mounted on the sliding block 4, and the limiting piece 31 is mounted on the shell 1;

the limiting piece 31 is provided with a compression surface 311, one end of the telescopic cylinder 32 abuts against the compression surface 311 directly or indirectly, and the telescopic cylinder 32 and the limiting piece 31 have a first relative position and a second relative position; in the process that the tension piece 2 pulls the sliding block 4 to move from the first position to the second position, the telescopic cylinder 32 moves from the first relative position to the second relative position; and in the process that the telescopic cylinder 32 moves from the first relative position to the second relative position, the telescopic cylinder 32 is gradually compressed.

Optionally, a compression stroke of the telescopic cylinder 32 is less than a sliding stroke of the sliding block 4 from the first position to the second position.

An included angle is formed between the compression surface 311 and the movement direction of the sliding block 4, and an inclination angle is formed between the telescopic direction of the telescopic cylinder 32 and the compression surface 311. In the process that the telescopic cylinder 32 moves from the first relative position to the second relative position, the telescopic cylinder 32 is gradually compressed under the action of the compression surface 311, and the compression stroke of the telescopic cylinder 32 is less than the sliding stroke of the sliding block 4 from the first position to the second position.

According to the embodiment of the present invention, the compression surface of the limiting piece is provided, so that the force generated when the telescopic cylinder is compressed can be converted into a resistance of the damper in the sliding process from the first position to the second position, thereby achieving a damping effect. Meanwhile, in the present invention, due to the action of the limiting piece, the telescopic direction of the telescopic cylinder can be different from the movement direction of the damper. It is ensured that the length of the projection of the compression surface in the compression direction of the telescopic cylinder is the same as the compression stroke and the length of the projection of the compression surface in the sliding direction of the sliding block is the same as the sliding stroke by adjusting the included angle between the compression surface of the limiting piece and the movement direction of the sliding block and the inclination angle between the telescopic direction of the telescopic cylinder and the compression surface. Compared with the traditional damper, the damper assembly has the advantages of reducing the requirement on the size of the air cylinder and the space occupied by the damping piece, thereby reducing the size of the damping structure. Meanwhile, since the size of the air cylinder is small, the cost of the damper can be effectively reduced.

Figure 2:
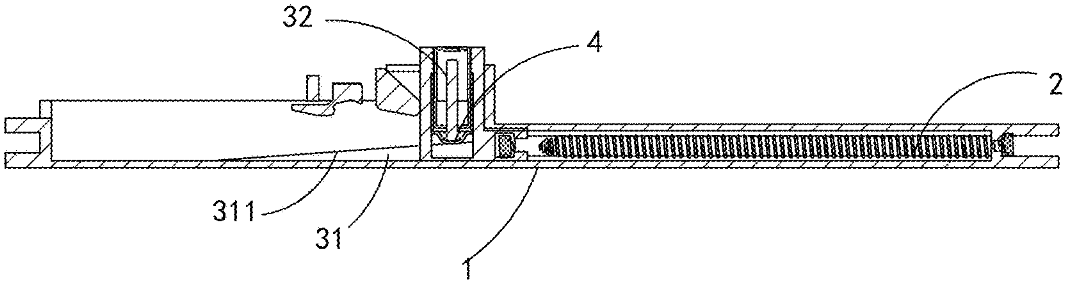
FIG. 2 is a front-view sectional structural schematic diagram of an embodiment according to a first aspect of the present invention.
Figure 3:
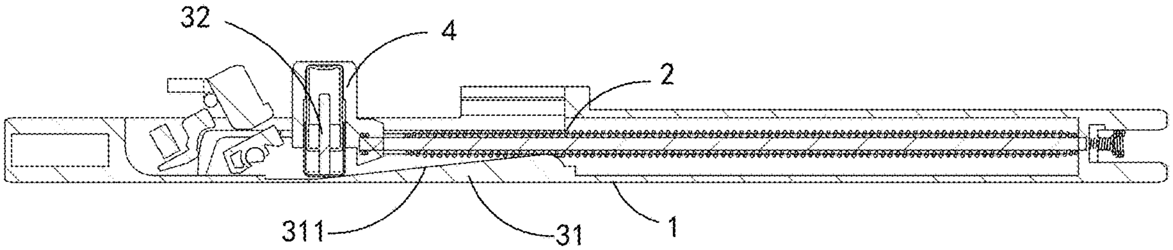
FIG. 3 is a sectional structural schematic diagram of a sliding block of an embodiment according to a first aspect of the present invention at a second position.
Figure 4:
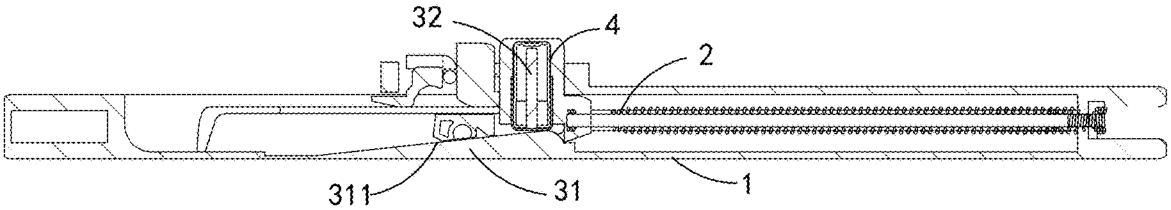
FIG. 4 is a sectional structural schematic diagram of a sliding block of an embodiment according to a first aspect of the present invention at a first position.
Figure 5:
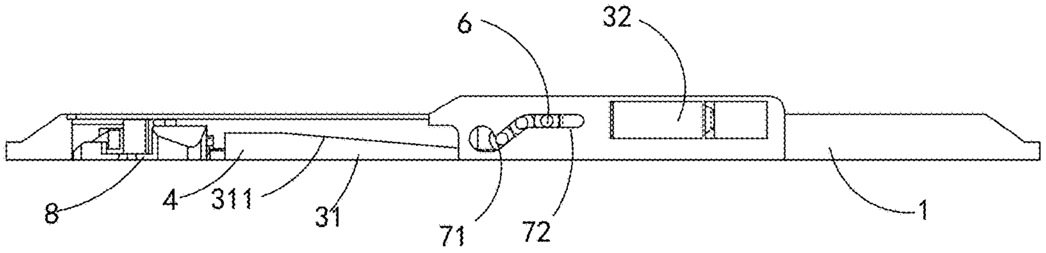
FIG. 5 is a front-view structural schematic diagram of a telescopic cylinder of an embodiment according to a first aspect of the present invention in an extended state.
Figure 6:
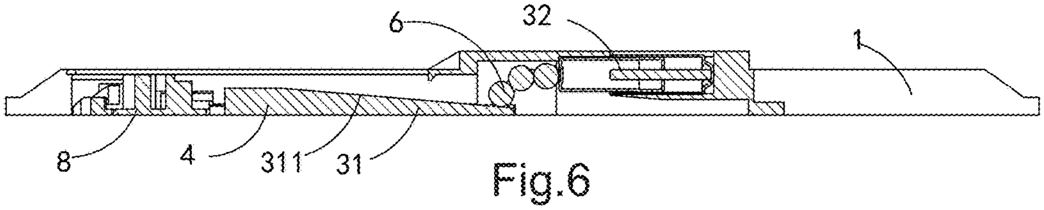
FIG. 6 is a front-view sectional structural schematic diagram of a telescopic cylinder of an embodiment according to a first aspect of the present invention in an extended state.
Figure 7:
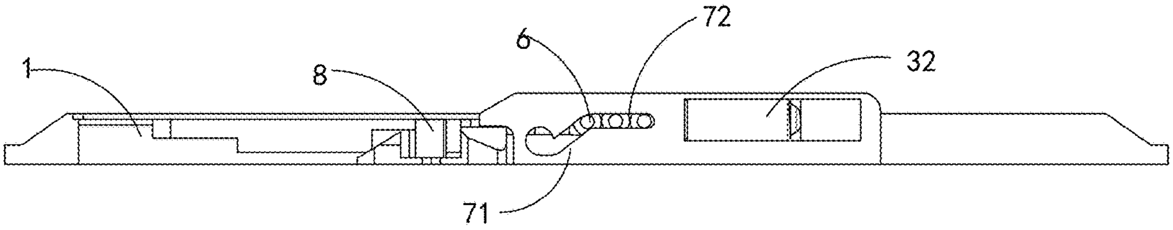
FIG. 7 is a front-view structural schematic diagram of a telescopic cylinder of an embodiment according to a first aspect of the present invention in a compressed state.
Figure 8:
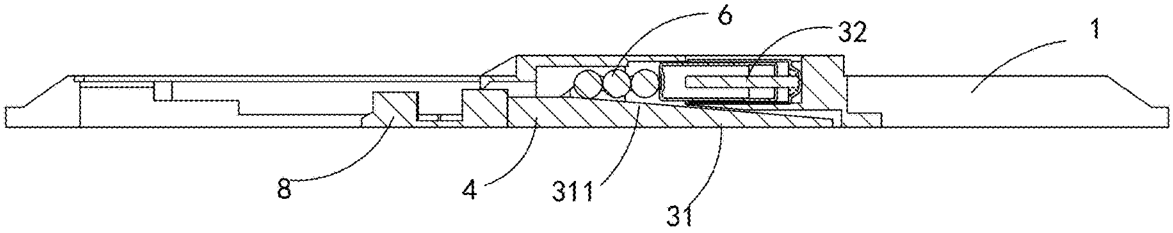
FIG. 8 is a front-view sectional structural schematic diagram of a telescopic cylinder of an embodiment according to a first aspect of the present invention in a compressed state.
Figure 9:
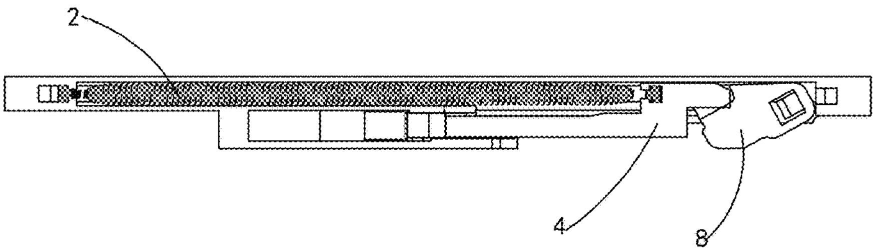
FIG. 9 is a bottom-view structural schematic diagram of an embodiment according to a first aspect of the present invention.
Figure 10:
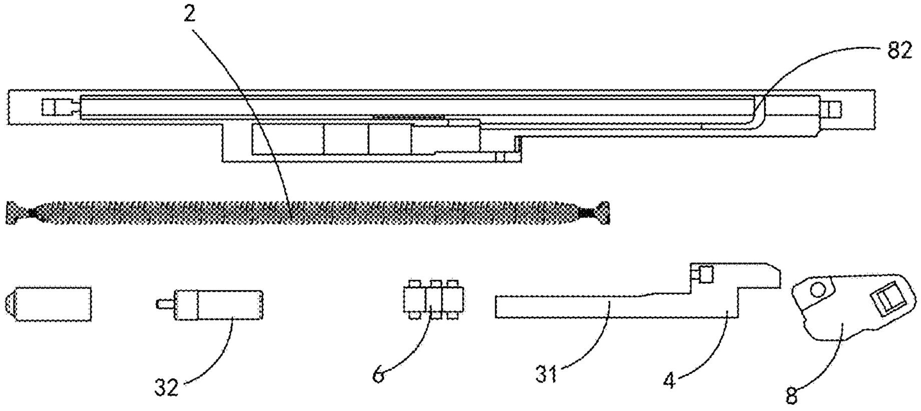
FIG. 10 is a bottom-view exploded structural schematic diagram of an embodiment according to a first aspect of the present invention.

In particular, as shown in FIG. 1 and FIG. 2, an inclination angle is formed between the telescopic cylinder 32 and the compression surface 311, and one end of the telescopic cylinder 32 abuts against the compression surface 311.

As shown in FIG. 1 and FIG. 2, the telescopic cylinder 32 is mounted on the sliding block 4, the limiting piece 31 and the shell 1 are of an integrated structure, and the telescopic cylinder 32 is perpendicular to the sliding direction of the sliding block 4.

In particular, a contact piece is arranged at one end of the telescopic cylinder 32, and the telescopic cylinder 32 abuts against the compression surface 311 through the contact piece.

The contact piece is of a sleeve structure and sleeves one end of the telescopic cylinder. The contact piece is optionally a plastic piece, so that the durability of the telescopic cylinder (air cylinder) is improved, and damage of a piston is avoided.

In particular, the contact piece is further provided with a ball, and the contact piece abuts against the compression surface 311 through the ball.

The ball is clamped in the contact piece, and the ball and the contact piece can slide relative to each other.

In particular, as shown in FIG. 5 to FIG. 10, the damper further comprises a sliding guide piece 6, the shell is provided with a sliding groove, one end of the sliding guide piece 6 is inserted into the sliding groove, the telescopic cylinder 32 abuts against the compression surface 311 through the sliding guide piece 6, the sliding groove comprises a first sliding groove portion 71 and a second sliding groove portion 72, and the first sliding groove portion 71 is connected to one end of the second sliding groove portion 72.

In particular, as shown in FIG. 5 to FIG. 10, the first sliding groove portion 71 and the second sliding groove portion 72 are each of a straight groove structure; the first sliding groove portion 71 is in bent connection with the second sliding groove portion 72; the limiting piece 31 is connected to the sliding block 4; the telescopic cylinder 32 is mounted on the shell 1; the first sliding groove portion 71 is located at the compression surface 311, and an inclination angle is formed between an extending direction of the first sliding groove portion 71 and the compression surface 311; an extending direction of the second sliding groove portion 72 is the same as a compression direction of the telescopic cylinder 32; and in the process that the sliding block 4 moves from the first position to the second position, a crossed position of the first sliding groove portion 71 and the compression surface 311 moves towards the second sliding groove portion.

As shown in FIG. 5 to FIG. 10, the limiting piece 31 and the sliding block 4 are of an integrated structure.

In particular, the sliding guide piece 6 comprises a first sliding end and a second sliding end, the first sliding end and the second sliding end are inserted into the sliding groove, the sliding guide piece 6 abuts against the telescopic cylinder 32 through the second sliding end, and the sliding guide piece 6 abuts against the compression surface 311 through the first sliding end.

A cylindrical connection structure is arranged between the first sliding end and the second sliding end of the sliding guide piece 6.

In the process that the sliding block moves from the first position to the second position, the crossed position of the first sliding groove portion and the compression surface moves towards the second sliding groove portion, the first sliding end connected to the compression surface is pushed by the compression surface to slide towards the second sliding groove portion, and the second sliding end connected to the telescopic cylinder enters the second sliding groove portion to compress the telescopic cylinder.

In particular, as shown in FIG. 5 to FIG. 10, a plurality of sliding guide pieces 6 are provided, and all the sliding guide pieces 6 are slidably connected to the sliding groove.

As shown in FIG. 5 to FIG. 10, there are totally three sliding guide pieces 6 which are of cylindrical structures, and the sliding guide pieces 6 abut against each other sequentially.

In the process that the sliding block moves from the first position to the second position, the crossed position of the first sliding groove portion and the compression surface moves towards the second sliding groove portion, the part, connected to the compression surface, of the sliding guide piece is pushed by the compression surface to slide towards the second sliding groove portion, and the part, connected to the telescopic cylinder, of the sliding guide piece enters the second sliding groove portion to compress the telescopic cylinder.

Figure 11:
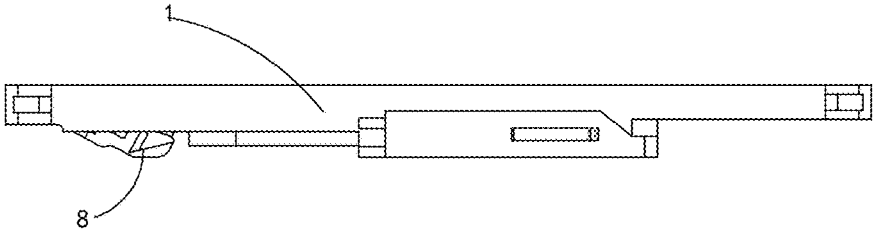
FIG. 11 is a top-view structural schematic diagram of an embodiment according to a first aspect of the present invention.
Figure 12:
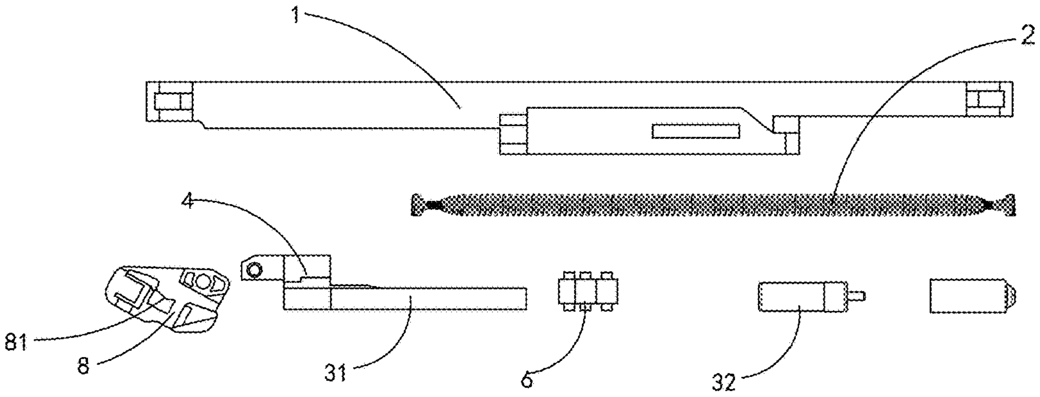
FIG. 12 is a top-view exploded structural schematic diagram of an embodiment according to a first aspect of the present invention.

Optionally, as shown in FIG. 11 to FIG. 12, the damper further comprises a shifting block 8; the shifting block 8 is mounted on the sliding block 3; the shifting block 8 is rotatably connected to the sliding block 3; the shell 1 is provided with a first clamping piece 11; the shifting block 8 is provided with a second clamping piece 81; and when the damping piece is located at the first position, the shifting block 8 is capable of realizing clamping between the second clamping piece 81 and the first clamping piece 82 through rotation.

Optionally, the hidden damper provided by the present invention can cooperate with a telescopic rail 9, the telescopic rail 9 comprises an outer rail 91 and an inner rail 92, the second clamping piece 81 is of a chute structure, and when the sliding block slides to the first position, clamping between the second clamping piece and the first clamping piece can be realized through rotation, so that the sliding block is fixed.

Second Aspect

According to a second aspect of the present invention, an embodiment of a sliding rail with a damping function is provided. As shown in FIG. 13 to FIG. 15 and FIG. 19 to FIG. 20, the sliding rail with the damping function comprises a rail 1; a damper body is arranged at at least one end of the rail 1; the damper body comprises a tension piece 2, a damping piece and a sliding block 4; the sliding block 4 is slidably mounted on the rail 1, and the sliding block 4 has a first position and a second position on the rail 1; the tension piece 2 is capable of pulling the sliding block 4 to move from the first position to the second position; the limiting piece 31 is a limiting rail 31, the damping piece comprises a limiting rail 31 and a telescopic cylinder 32; the telescopic cylinder 32 is slidably mounted on the limiting rail 31; the telescopic cylinder 32 has a first limiting position and a second limiting position on the limiting rail 31; the compression surface 311 is a side wall 311, the limiting rail 31 is provided with at least one side wall 311 forming an included angle with the direction of the rail 1, and the side wall 311 forming an included angle with the direction of the rail 1 inclines towards the telescopic cylinder 32 from the first limiting position to the second limiting position; in the process that the sliding block 4 slides from the first position to the second position, the sliding block 4 drives the telescopic cylinder 32 to move from the first limiting position to the second limiting position; and in the movement process, one end of the telescopic cylinder 32 abuts against the side wall 311 forming an included angle with the direction of the rail 1.

Figure 13:
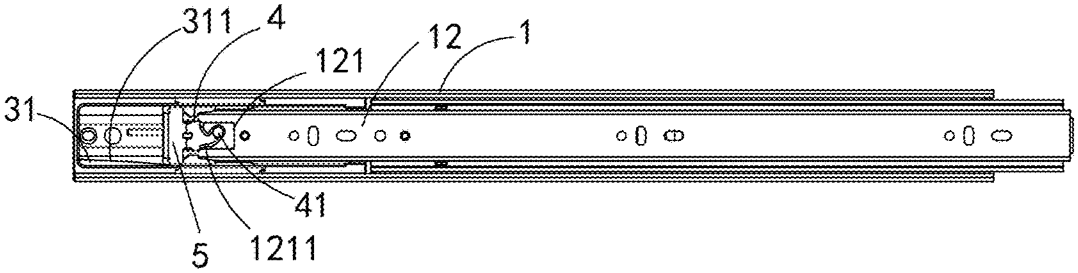
FIG. 13 is a structural schematic diagram of a sliding block of an embodiment according to a second aspect of the present invention at a first position.
Figure 14:
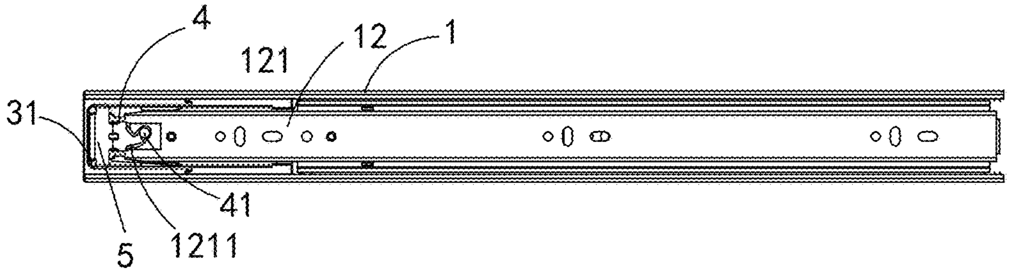
FIG. 14 is a structural schematic diagram of a sliding block of an embodiment according to a second aspect of the present invention at a second position.
Figure 15:
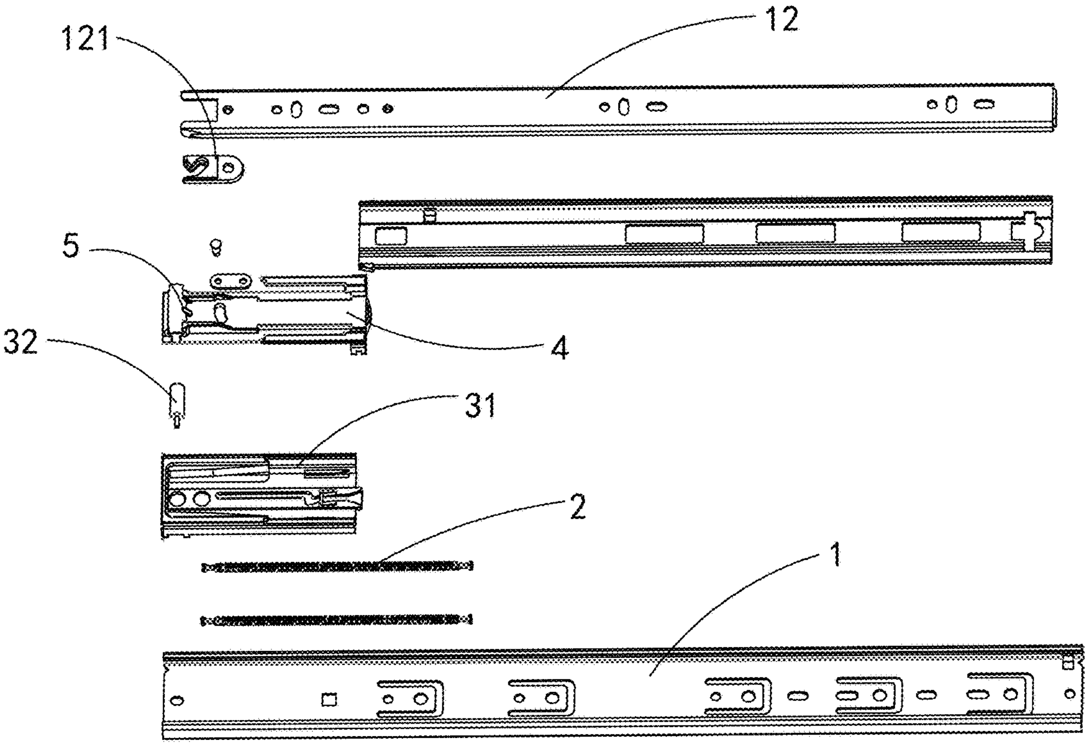
FIG. 15 is an exploded structural schematic diagram of an embodiment according to a second aspect of the present invention.

Optionally, as shown in FIG. 13 to FIG. 15, the sliding block 4 is fixedly connected to the telescopic cylinder 32.

As shown in FIG. 13 to FIG. 15, the telescopic cylinder 32 is mounted at the end of the sliding block 4 close to the limiting rail 31, and in the process of moving towards the second position, the sliding block 4 pushes the telescopic cylinder 32 to move towards the second limiting position.

According to the embodiment of the present invention, the side wall of the limiting rail abuts against the telescopic cylinder, so that the force of the telescopic cylinder is converted into a resistance in the process that the telescopic cylinder moves from the first limiting position to the second limiting position, thereby applying the resistance to the process that the sliding block slides from the first position to the second position and achieving a damping effect; meanwhile, the use of a long air cylinder is avoided, so that the space occupied by the damping piece is reduced, and the size of the sliding rail with a damping function can be further reduced, thereby saving space.

Figure 16:
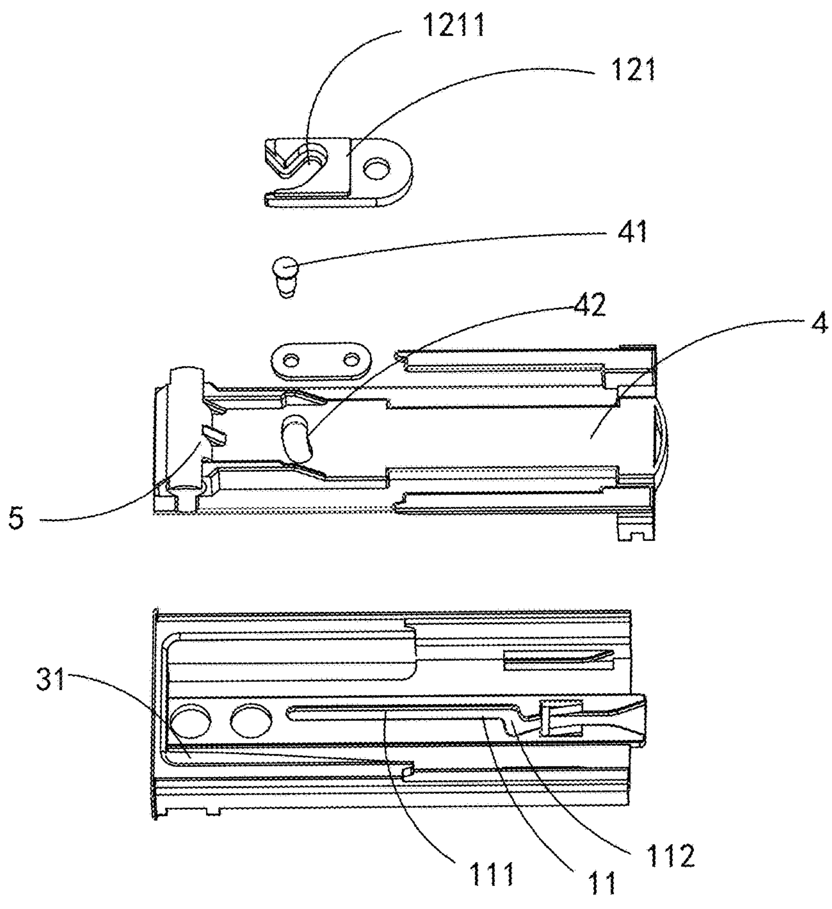
FIG. 16 is an exploded structural schematic diagram of a sliding block of an embodiment according to a second aspect of the present invention.

Optionally, as shown in FIG. 16, the sliding block 4 is provided with a limiting portion 41, the sliding rail 1 is provided with a sliding groove 11, and one end of the limiting portion 41 is inserted into the sliding groove 11.

In particular, as shown in FIG. 16, the sliding block 4 is provided with an arc-shaped hole 42; the limiting portion 41 is slidably mounted in the arc-shaped hole 42; the sliding groove 11 comprises a straight groove portion 111 and a bent portion 112; one end of the straight groove portion 111 is connected to one end of the bent portion 112; when the sliding block 4 is located at the first position, the bent portion 112 coincides with the arc-shaped hole 42, and the limiting portion 41 is capable of sliding along the arc-shaped hole 42; and in the sliding process, one end of the limiting portion 41 is inserted into the bent portion 112.

The sliding groove 11 is located on the limiting rail 31, and the limiting rail 31 is fixed at one end of the rail 1.

In particular, as shown in FIG. 16, the rail 1 is further provided with a sliding piece 12; the sliding piece 12 is slidably connected to the rail 1; a guide piece 121 is arranged at the end of the sliding piece 12 facing the sliding block 4, and the guide piece 121 is provided with a guide groove 1211 capable of being clamped with the limiting portion 41; and in the process that the guide piece 121 moves towards the sliding block 4, the limiting portion 41 slides towards the end of the bent portion 112 close to the straight groove portion 111 under the action of the guide groove 1211.

As shown in FIG. 16, the rail 1 is of a telescopic rail structure, and the sliding piece 12 is an inner rail of the telescopic rail structure.

Figure 17:
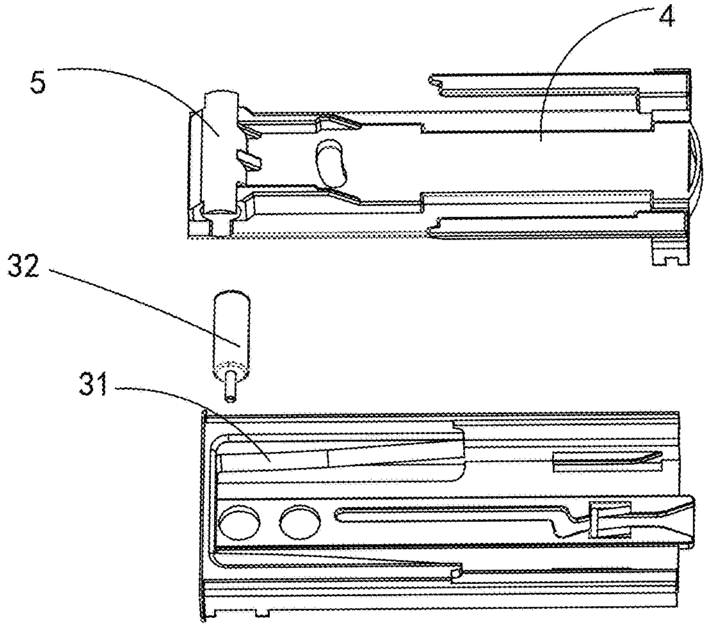
FIG. 17 is an exploded structural schematic diagram of a damping piece of an embodiment according to a second aspect of the present invention.

Optionally, as shown in FIG. 17, the telescopic cylinder 32 is an air cylinder, and two ends of the air cylinder directly abut against two side walls of the limiting rail 31.

Optionally, as shown in FIG. 17, the limiting rail 31 is a conical rail, and a width of the limiting rail 31 is gradually reduced from the first limiting position to the second limiting position; and in the process that the telescopic cylinder 32 moves from the first limiting position to the second limiting position, two ends of the telescopic cylinder 32 abut against two side walls 311 of the limiting rail 31 respectively.

As shown in FIG. 17, in the process that the telescopic cylinder 32 moves from the first limiting position to the second limiting position, since the width of the limiting rail is reduced, the telescopic cylinder 32 is compressed, the telescopic cylinder 32 applies pressure to the side wall 311 of the limiting rail 31, and the pressure is converted into a resistance opposite to the tension, thereby achieving a damping effect.

Figure 18:
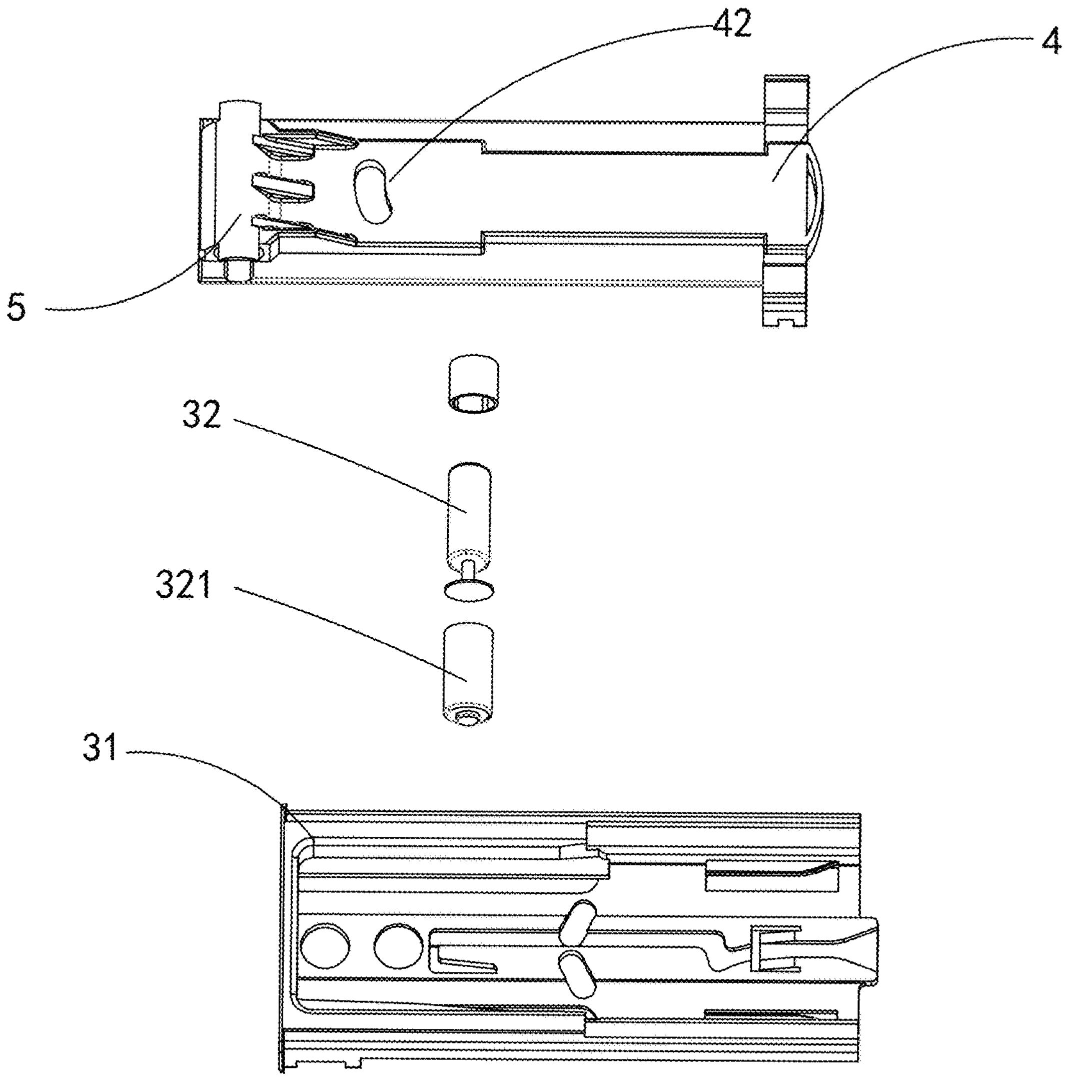
FIG. 18 is an exploded structural schematic diagram of a damping piece with a contact piece of an embodiment according to a second aspect of the present invention.
Figure 19:
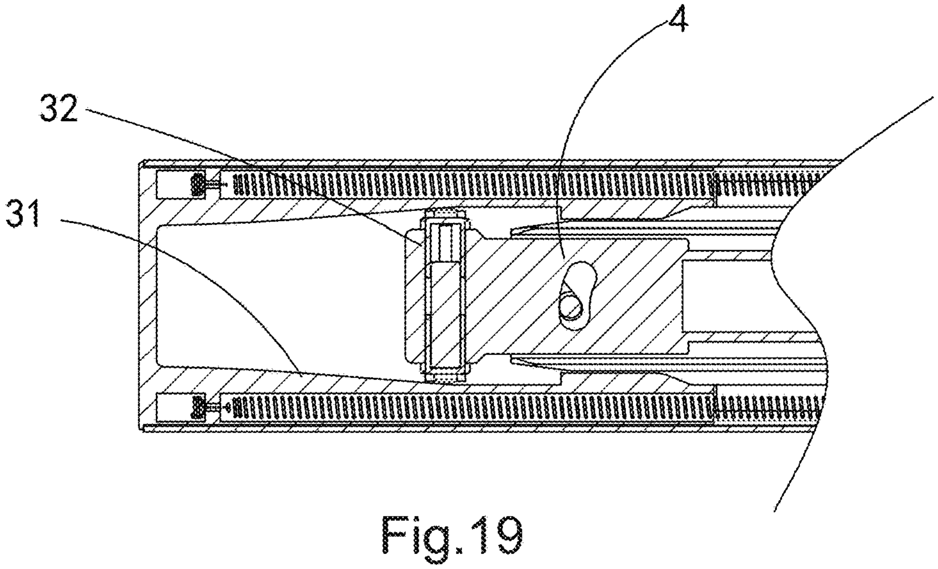
FIG. 19 is a sectional structural schematic diagram of a sliding block of an embodiment according to a second aspect of the present invention at a first position.
Figure 20:
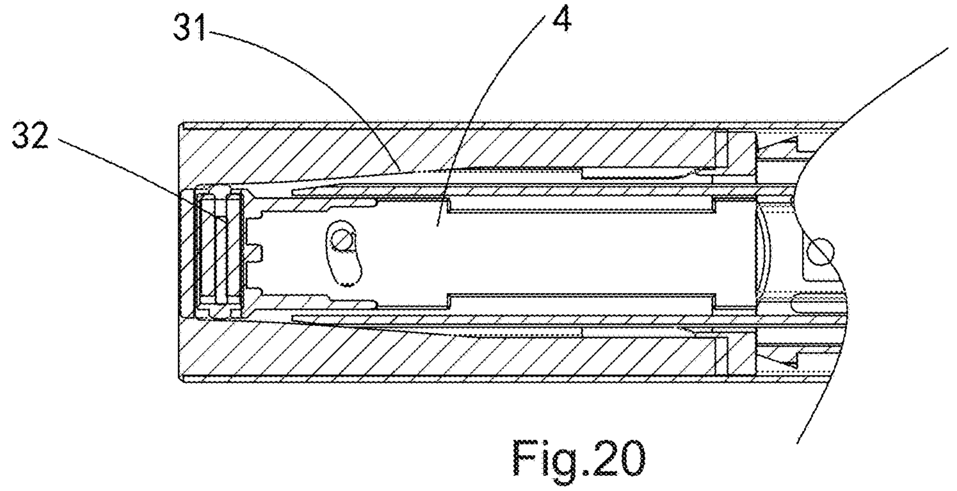
FIG. 20 is a sectional structural schematic diagram of a sliding block of an embodiment according to a second aspect of the present invention at a second position.
Figure 21:
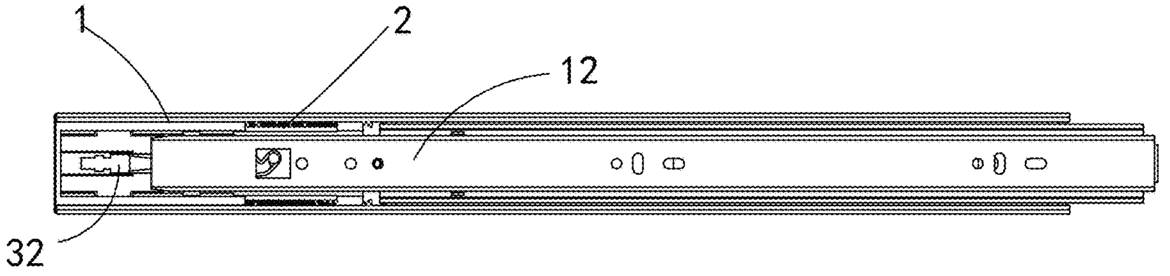
FIG. 21 is a structural schematic diagram of an embodiment according to a third aspect of the present invention.

Optionally, as shown in FIG. 18, a contact piece 321 is arranged at at least one end of the telescopic cylinder 32, and the telescopic cylinder 32 abuts against the limiting rail 31 through the contact piece 321.

As shown in FIG. 18, the contact pieces 321 are each of a sleeve structure and sleeve two ends of the telescopic cylinder 32. The contact piece 321 is optionally a plastic piece, so that the contact area between the telescopic cylinder 32 and the limiting rail 31 can be increased, the durability of the telescopic cylinder 32 (air cylinder) can be improved, and damage of a piston can be avoided.

In particular, as shown in FIG. 18, the contact piece 321 is provided with a ball, and the telescopic cylinder 32 abuts against the limiting rail 31 through the ball.

As shown FIG. 18, the ball is clamped in the contact piece 321, and the ball and the contact piece 321 can slide relative to each other.

According to the embodiment of the present invention, by the adoption of the ball, the friction between the contact piece and the limiting rail is reduced, the durability of the contact piece is improved, and the sliding smoothness of the telescopic cylinder is also improved.

Optionally, as shown in FIG. 17, the damping piece further comprises a fixator 5, the fixator 5 is slidably mounted on the limiting rail 31, and the telescopic cylinder 32 is inserted into the fixator 5.

As shown in FIG. 17 to FIG. 20, the fixator 5 is of a sleeve structure, and the fixator 5 and the sliding block 4 are of an integrated structure; and the telescopic cylinder 32 is inserted into the fixator 5, and two ends of the telescopic cylinder 32 are located outside the fixator 5.

According to the embodiment of the present invention, by the adoption of the fixator, the telescopic process of the telescopic cylinder is not affected while the telescopic cylinder can be stably mounted on the sliding block.

Optionally, as shown in FIG. 15, two tension pieces 2 are provided, and the two tension pieces 2 are respectively connected to two sides of the sliding block 4 close to the rail 1.

The tension piece 2 is a spring.

According to the embodiment of the present invention, by the adoption of the two tension pieces, the tension applied to the sliding block is balanced, thereby ensuring that the sliding block can stably slide.

Third Aspect

According to a third aspect of the present invention, an embodiment of a linear pushing and pressing damping sliding rail is disclosed. As shown in FIG. 21 to FIG. 27, the shell (1) is a rail; a damper body is arranged at at least one end of the rail 1; the damper body comprises a tension piece 2, a damping piece 22, a sliding block 4 and an abutting piece 24; the sliding block 4 is slidably mounted on the rail 1, and the sliding block 4 has a first position and a second position on the rail 1; the tension piece 2 is capable of pulling the sliding block 4 to move from the first position to the second position; the sliding block 4 is provided with a limiting rail 231, and the limiting rail 231 is provided with at least one side wall 2311 forming an included angle with the direction of the rail 1; the damping piece 22 comprises a telescopic cylinder 32, and the telescopic cylinder 32 is mounted on the rail 1; the rail 1 is provided with an abutting groove 16, and the abutting piece 24 is slidably mounted in the abutting groove 16; the telescopic cylinder 32 abuts against the side wall 2311, forming an included angle, of the limiting rail 231 through the abutting piece 24; an inclination angle is formed between the abutting groove 16 and the side wall 2311, forming an included angle, of the limiting rail 231, and an inclination angle is formed between the abutting groove 16 and the rail 1; the abutting piece 24 has a first abutting position and a second abutting position at the abutting groove; in the process that the sliding block 4 slides from the first position to the second position, the sliding block 4 drives the abutting piece 24 to slide from the first abutting position to the second abutting position; the abutting piece 24 compresses the telescopic cylinder 32 in the sliding process; and the length of a projection of the abutting groove 16 in the direction of the rail 1 is less than the length of the limiting rail 231.

A telescopic direction of the telescopic cylinder 32 is the same as the direction of the rail 1.

Figure 22:
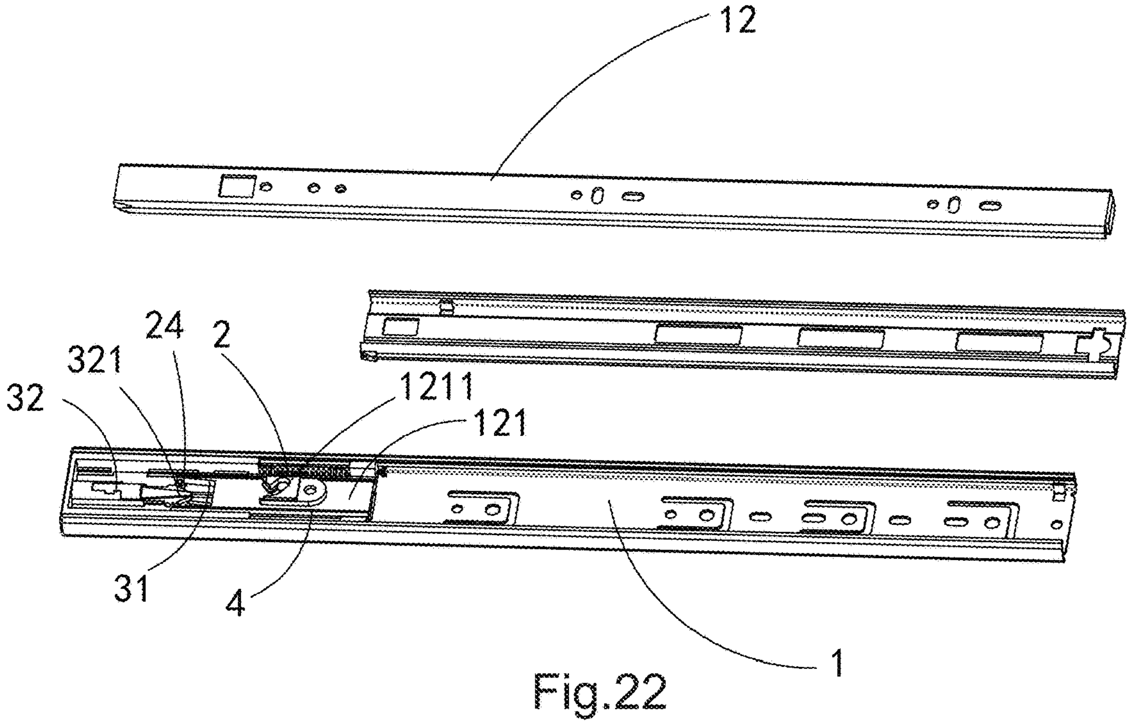
FIG. 22 is an exploded structural schematic diagram of an embodiment according to a third aspect of the present invention.
Figure 25:
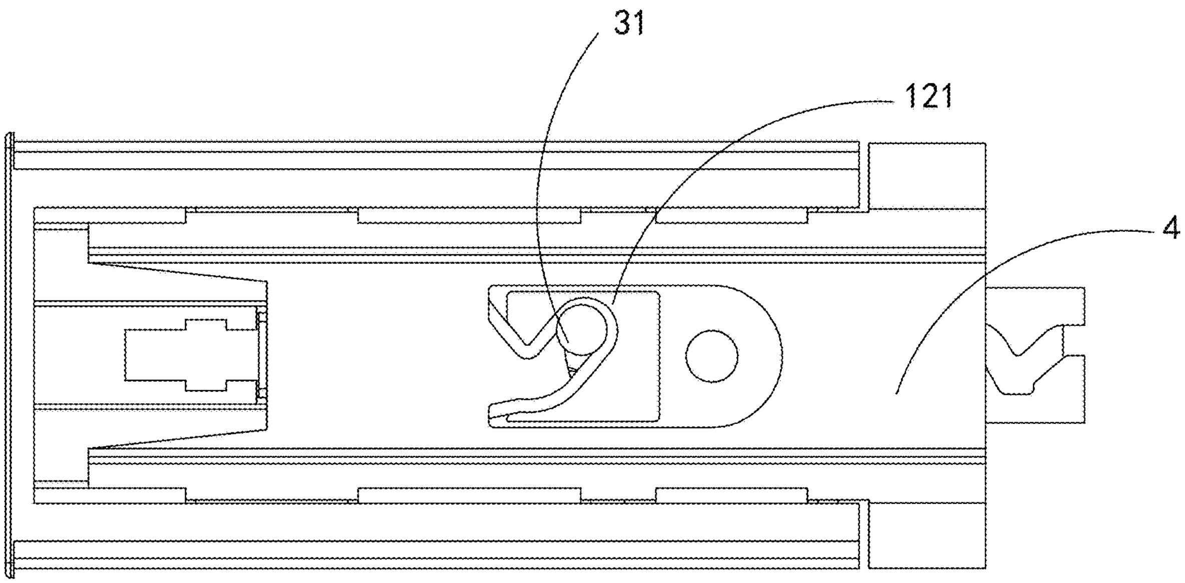
FIG. 25 is a top view of a sliding block of an embodiment according to a third aspect of the present invention at a second position.

When the sliding block is located at the first position, as shown in FIG. 22 and FIG. 25, the abutting piece 24 is located at the first abutting position of the abutting groove 16 and abuts against one end of the telescopic cylinder 32. When the tension piece 2 drives the sliding block 4 to slide towards the second position, the limiting rail 231 presses against the abutting piece 24, so that the abutting piece 24 slides towards the second abutting position along the abutting groove 16, and the abutting piece 24 compresses the telescopic cylinder 32; and the compression length of the telescopic cylinder 32 is related to a projection of the abutting groove 16 in the telescopic direction of the telescopic cylinder 32, since the length of a projection of the abutting groove 16 in the direction of the rail 1 is less than the length of the limiting rail 231 (the length of the limiting rail 231 in the direction of the rail 1), the compression length of the telescopic cylinder 32 is less than the length of the limiting rail 231.

According to the embodiment of the present invention, the abutting piece abuts against the side wall of the limiting rail and the telescopic cylinder, so that when the sliding block moves, the abutting piece moves relative to the sliding block in the direction of the rail to compress the telescopic cylinder, and the force of the telescopic cylinder is converted into a resistance of the sliding block in the process of moving from the first position to the second position, thereby achieving a damping effect; meanwhile, the use of a long air cylinder is avoided, so that the space occupied by the damping piece is reduced, and the size of the linear pushing and pressing damping sliding rail can be further reduced, thereby saving space.

Figure 23:
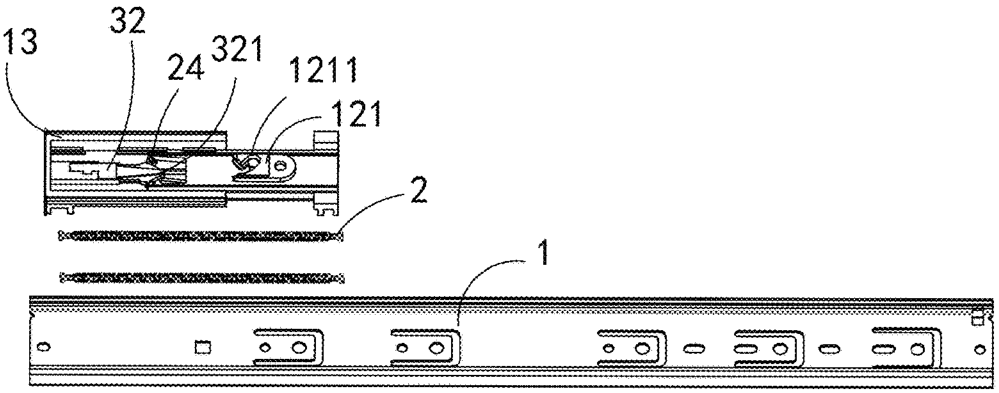
FIG. 23 is a structural schematic diagram of a sliding block of an embodiment according to a third aspect of the present invention at a first position.
Figure 26:
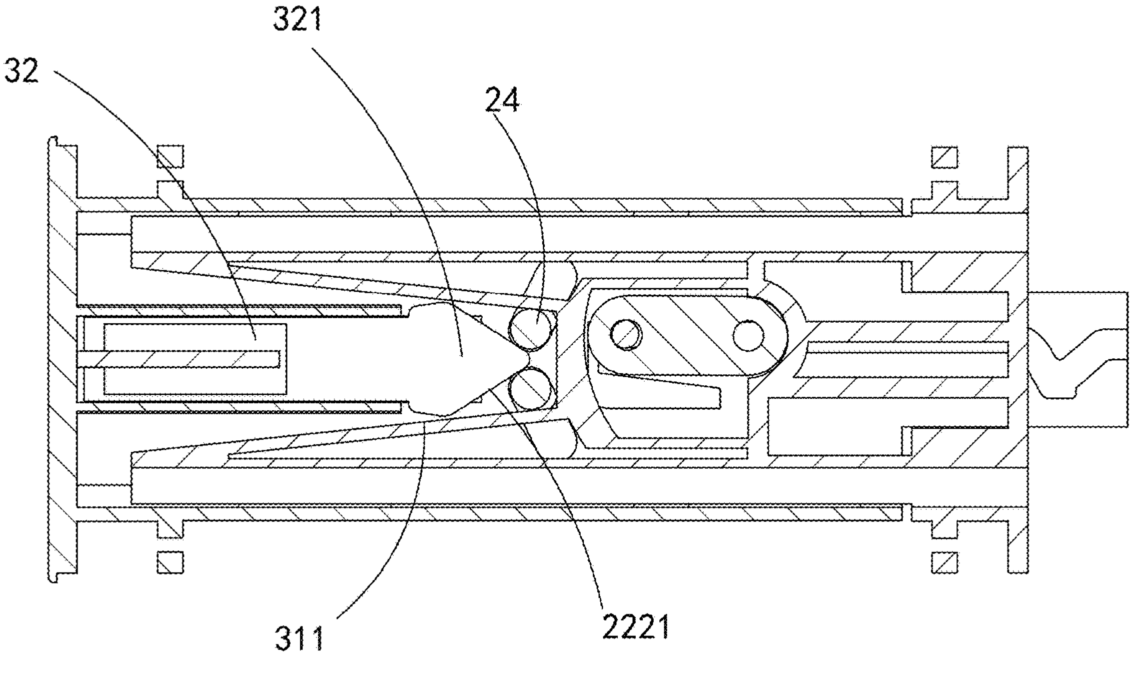
FIG. 26 is a sectional view of a sliding block of an embodiment according to a third aspect of the present invention at a second position.

Optionally, as shown in FIG. 23 and FIG. 26, the sliding block 4 is provided with a limiting piece 31, the sliding rail 1 is provided with a sliding groove 11, and one end of the limiting piece 31 is inserted into the sliding groove 11.

Figure 24:
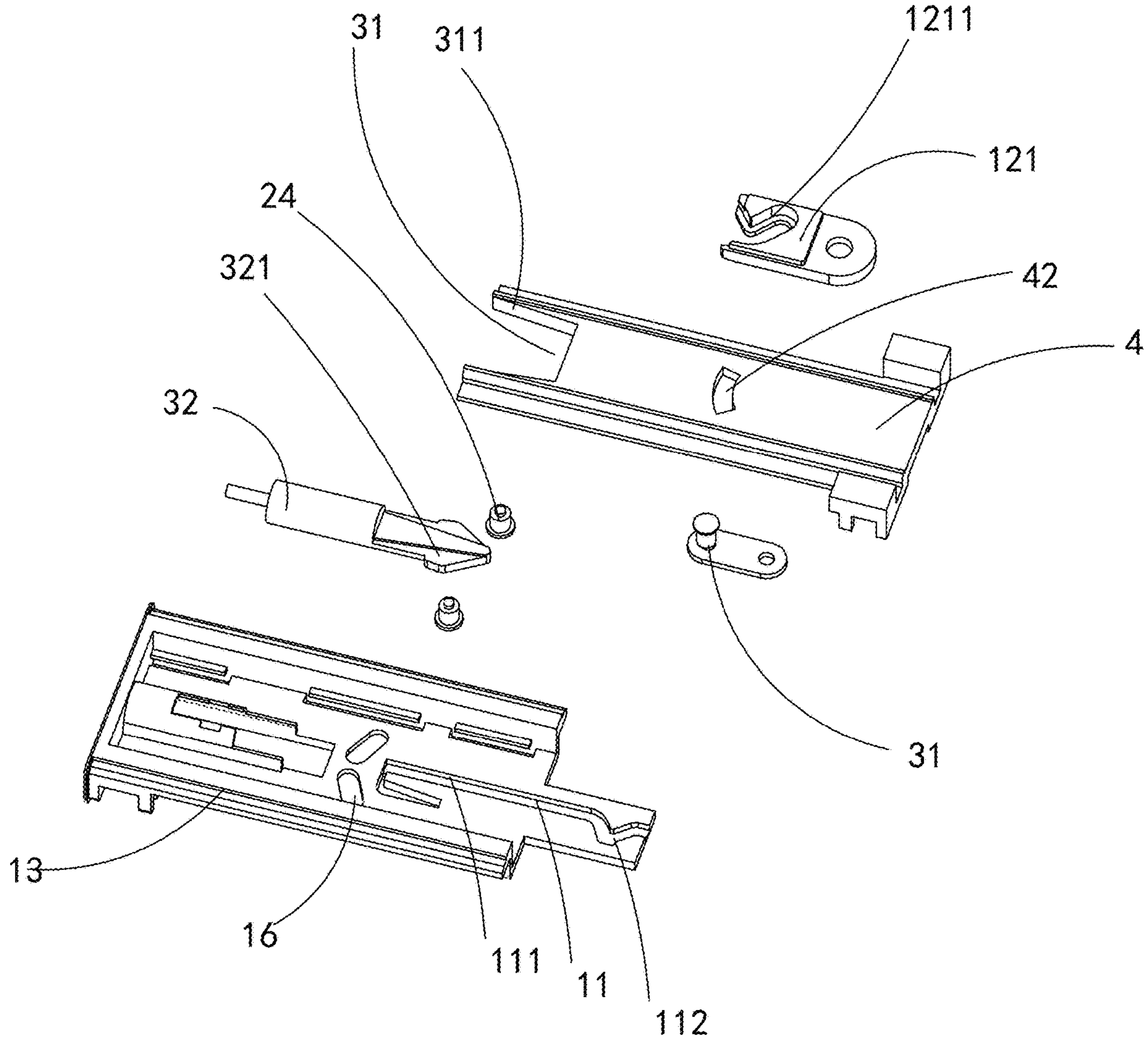
FIG. 24 is an exploded structural schematic diagram of a sliding block of an embodiment according to a third aspect of the present invention at a first position.

In particular, as shown in FIG. 24, the sliding block 4 is provided with an arc-shaped hole 42; the limiting piece 31 is slidably mounted in the arc-shaped hole 42; the sliding groove 11 comprises a straight groove portion 111 and a bent portion 112; one end of the straight groove portion 111 is connected to one end of the bent portion 112; when the sliding block 4 is located at the first position, the bent portion 112 coincides with the arc-shaped hole 42, and the limiting piece 31 is capable of sliding along the arc-shaped hole 42; and in the sliding process, one end of the limiting piece 31 is inserted into the bent portion 112.

As shown in FIG. 21 to FIG. 27, a fixed piece 13 is arranged on the rail 1, the abutting groove 16 and the sliding groove 11 are located on the fixed piece 13, and the damping piece 22 is fixedly mounted on the fixed piece 13.

In particular, as shown in FIG. 21 to FIG. 27, the rail 1 is further provided with a sliding piece 12; the sliding piece 12 is slidably connected to the rail 1; a guide piece 121 is arranged at the end of the sliding piece 12 facing the sliding block 4, and the guide piece 121 is provided with a guide groove 1211 capable of being clamped with the limiting piece 31; and in the process that the guide piece 121 moves towards the sliding block 4, the limiting piece 31 slides towards the end of the bent portion 112 close to the straight groove portion 111 under the action of the guide groove 1211.

The rail 1 is of a telescopic rail structure, and the sliding piece 12 is an inner rail of the telescopic rail structure.

Optionally, as shown in FIG. 21 to FIG. 27, the telescopic cylinder 32 is provided with a contact piece 321, the contact piece 321 is provided with a contact surface 2221, the contact piece 321 abuts against the abutting piece 24 through the contact surface 2221, and an included angle is formed between the contact surface 2221 and the direction of the rail 1.

In particular, as shown in FIG. 21 to FIG. 27, the limiting rail 231 is a conical rail, an included angle is formed between each of two side walls 2311 of the limiting rail 231 and the direction of the rail 1, two abutting pieces 24 are provided, the two abutting pieces 24 abut against the two side walls 2311 of the limiting rail 231 respectively, the contact piece 321 is provided with two symmetrical contact surfaces 2221, and the two contact surfaces 2221 abut against the two abutting pieces 24 respectively.

As shown in FIG. 25, the abutting piece 24 slides along the abutting groove 16 under the action of the limiting rail 231, and the abutting piece 24 presses against the contact surface 2221 of the contact piece 321. Due to the included angle between the abutting groove 16 and the contact surface 2221, the abutting piece 24 and the contact surface 2221 slide relative to each other while the contact piece 321 slides in the direction of the rail 1.

In particular, as shown in FIG. 21 to FIG. 27, the contact piece 321 is a conical piece, and the two contact surfaces 2221 are two sides of the conical piece.

When the sliding block is located at the first position, as shown in FIG. 22 and FIG. 23, the abutting piece 24 is located at the first abutting position of the abutting groove 16 and abuts against a wider end of the contact piece 321. When the tension piece 2 drives the sliding block 4 to slide towards the second position, the limiting rail 231 presses against the abutting piece 24, so that the abutting piece 24 slides along the abutting groove 16; the abutting piece 24 applies pressure to the contact piece 321, so that the abutting piece 24 and the contact surface 2221 slide relative to each other, as shown in FIG. 25. When the sliding block 4 is located at the second position, the abutting piece 24 is located at the second abutting position, and at this time, the abutting piece 24 abuts against a narrower end (that is, the conical tip) of the contact piece 321.

According to the embodiment of the present invention, the abutting piece abuts against the side wall of the limiting rail and the contact piece, so that when the sliding block moves, the abutting piece moves relative to the sliding block in the direction of the rail to compress the contact piece, and the force of the contact piece is converted into a resistance of the sliding block in the process of moving from the first position to the second position, thereby achieving a damping effect; meanwhile, the use of a long air cylinder is avoided, so that the space occupied by the damping piece is reduced, and the size of the linear pushing and pressing damping sliding rail can be further reduced, thereby saving space.

In particular, as shown in FIG. 21 to FIG. 27, the abutting piece 24 is cylindrical.

One end of the abutting piece 24 is slidably connected to the abutting groove 16.

Figure 27:
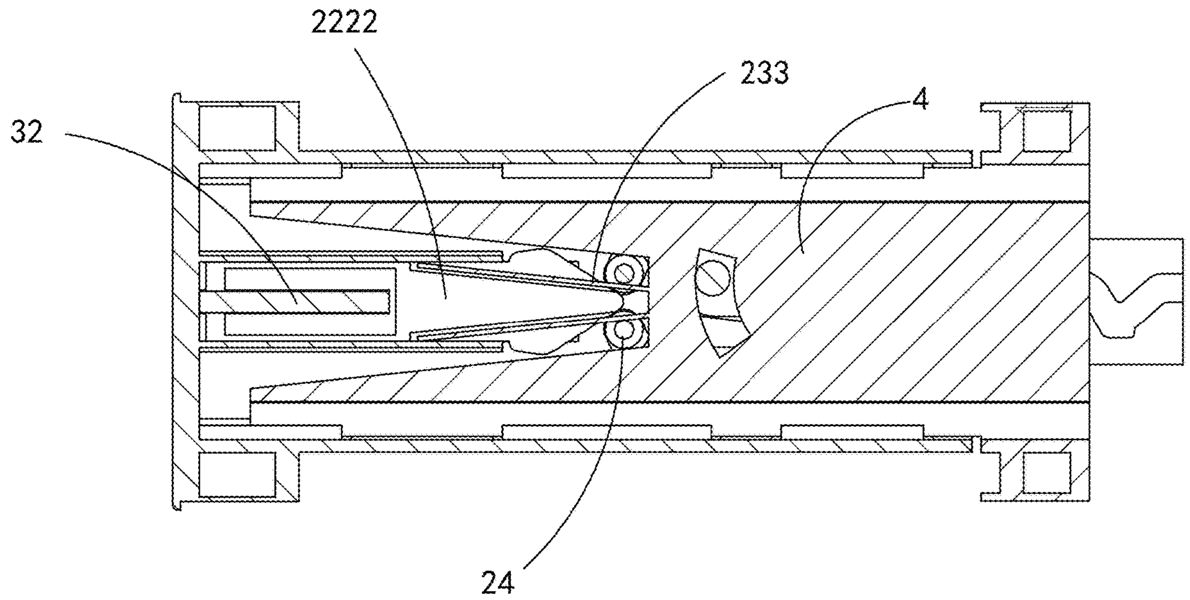
FIG. 27 is a sectional view of a conical clamping piece of an embodiment according to a third aspect of the present invention.

In particular, as shown in FIG. 27, a conical clamping piece 2222 is arranged on one side of the contact piece 321, the sliding block 4 is provided with a conical clamping groove 233, and when the sliding block 4 is located at the second position, the conical clamping piece 2222 is clamped with the conical clamping groove 233.

As shown in FIG. 27, a conical clamping groove 233 is arranged at one side of the sliding block 4, and when the sliding block 4 slides towards the second position, the conical clamping piece 2222 and the conical clamping groove 233 slide relative to each other and are clamped, thereby ensuring that the sliding block 4 will not slide excessively.

Optionally, as shown in FIG. 22, two tension pieces 2 are provided, and the two tension pieces 2 are respectively connected to two sides of the sliding block 4 close to the rail 1.

The tension piece 2 is a spring.

According to the embodiment of the present invention, by the adoption of the two tension pieces, the tension applied to the sliding block is balanced, thereby ensuring that the sliding block can stably slide.

Fourth Aspect

Figure 28:
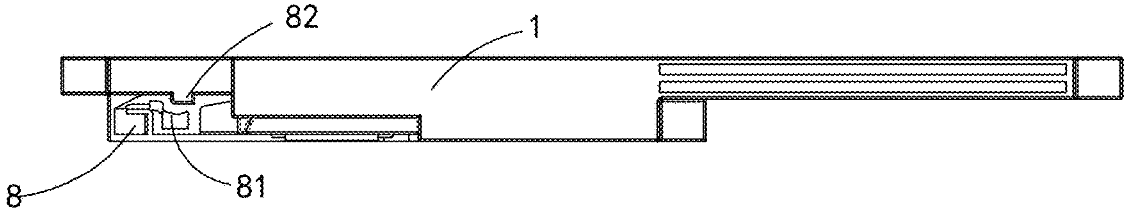
FIG. 28 is a front view of an embodiment according to a fourth aspect of the present invention.
Figure 29:
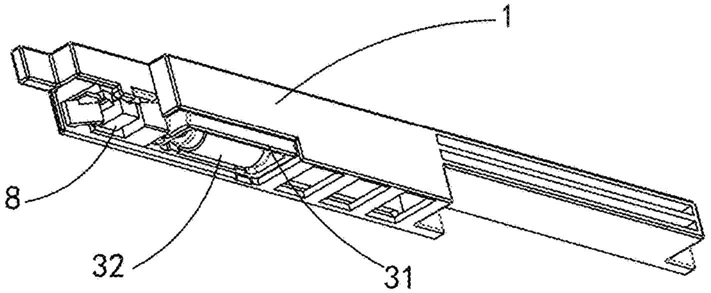
FIG. 29 is a three-dimensional diagram of an embodiment according to a fourth aspect of the present invention.
Figure 30:
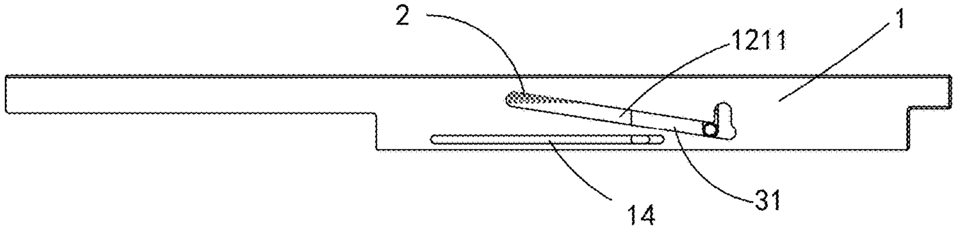
FIG. 30 is a rear view of an embodiment according to a fourth aspect of the present invention.

According to a fourth aspect of the present invention, an embodiment of a hidden damping structure is disclosed. As shown in FIG. 28 to FIG. 30, the hidden damping structure comprises a shell 1 and a damper body; the damper body comprises a tension piece 2 and a damping piece; the damping piece is slidably mounted in the shell 1; the tension piece 2 is connected to the shell 1 and the damping piece; the damping piece has a first position and a second position in the shell 1; the tension piece 2 is capable of pulling the damping piece to move from the first position to the second position; the damping piece comprises a limiting piece 31 and a telescopic cylinder 32; a limiting groove 312 is arranged in the limiting piece 31; the telescopic cylinder 32 is slidably mounted in the limiting groove; the telescopic cylinder 32 has a first limiting position and a second limiting position in the limiting groove 312; in the process that the telescopic cylinder 32 moves from the first limiting position to the second limiting position, at least one end of the telescopic cylinder 32 abuts against the side wall of the limiting groove 312 and is compressed; the shell 1 is further provided with a guide groove 1211; the telescopic cylinder 32 is slidably connected to the guide groove 1211; an included angle is formed between the guide groove 1211 and the movement direction of the damping piece; when the damping piece is at the first position, the telescopic cylinder 32 is located at the first limiting position; and when the damping piece is at the second position, the telescopic cylinder 32 is located at the second limiting position.

Optionally, as shown in FIG. 28 to FIG. 30, the shell 1 is provided with a horizontal groove 14, the damping piece is slidably connected to the horizontal groove 14, and an included angle is formed between the guide groove 1211 and the horizontal groove 14.

Figure 32:
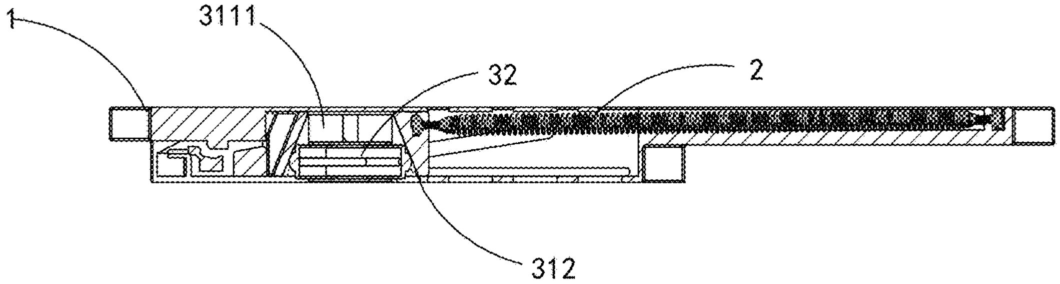
FIG. 32 is a structural schematic diagram of a damper of an embodiment according to a fourth aspect of the present invention at a first position.
Figure 33:
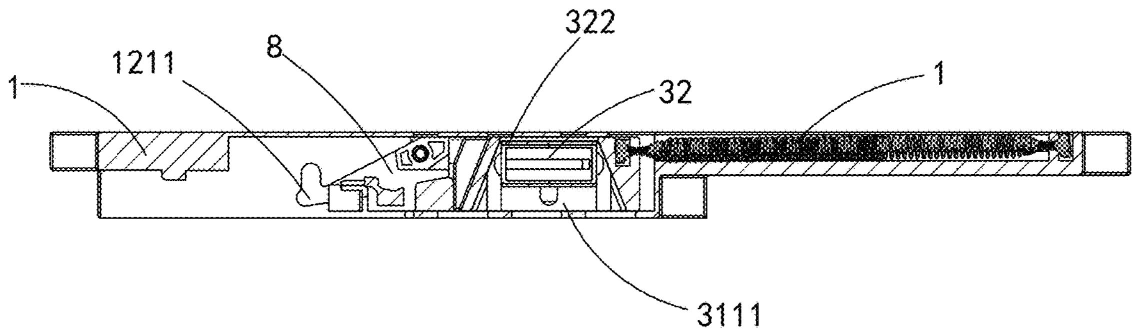
FIG. 33 is a structural schematic diagram of a damper of an embodiment according to a fourth aspect of the present invention at a second position.

The tension piece 2 is a spring. As shown in FIG. 32 to FIG. 33, in the process that the damping piece moves from the first position to the second position, the telescopic cylinder 32 is affected by the guide groove 1211 to ascend in the limiting piece 31 and move from the first limiting position to the second limiting position; and in the movement process, the telescopic cylinder 32 is compressed to generate a reverse pressure to the limiting groove 312, and the reverse pressure is converted into a resistance in the movement process of the damping piece by the guide groove 1211, thereby achieving a damping effect.

According to the embodiment of the present invention, the guide groove structure is provided, so that the force generated when the telescopic cylinder is compressed can be converted into the resistance of the damper in the sliding process from the first position to the second position, thereby achieving a damping effect; meanwhile, due to the action of the guide groove, the telescopic direction of the telescopic cylinder can be different from the movement direction of the damper, so that the requirement of the traditional damper on the size of the air cylinder is avoided, and the space occupied by the damping piece and the size of the damping structure are reduced.

Optionally, as shown in FIG. 28 to FIG. 30, the damping structure further comprises a shifting block 8, and the shifting block 8 is mounted on the damping piece.

In particular, as shown in FIG. 28 to FIG. 30, the shifting block 8 is rotatably connected to the damping piece, the shell 1 is provided with a first clamping piece 82, and when the damping piece is located at the first position, the shifting block 8 can realize clamping between a second clamping piece 81 and the first clamping piece 82 through rotation.

As shown in FIG. 28 to FIG. 30, the second clamping piece 81 has a clamping groove structure; and when the damping piece is located at the first position, the second clamping piece 81 and the first clamping piece 82 are clamped through rotation of the shifting block 8, thereby ensuring that the damping piece is fixed at the first position.

Figure 31:
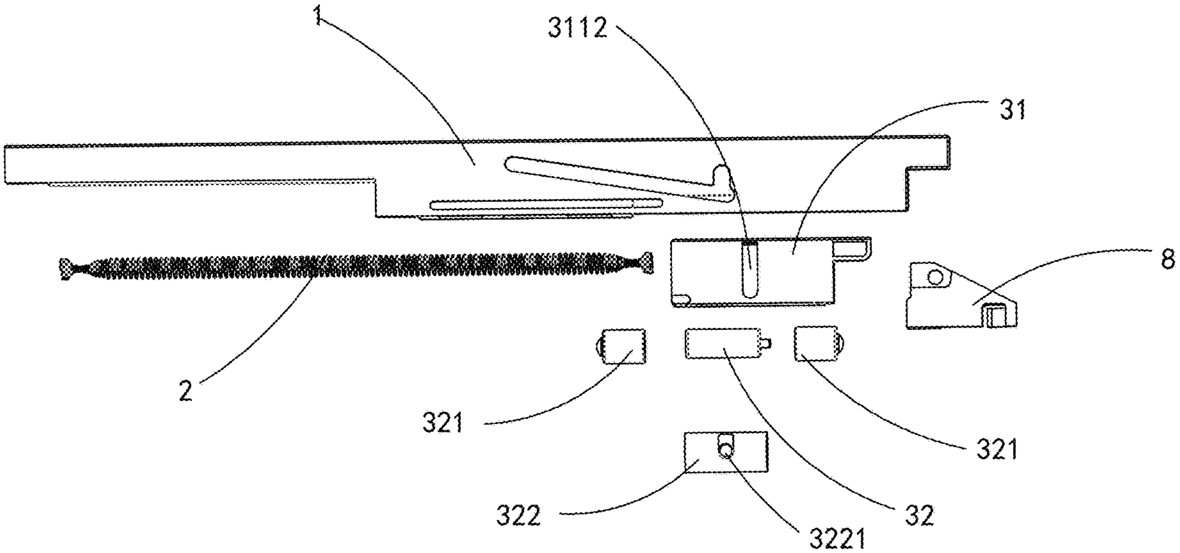
FIG. 31 is an exploded view of an embodiment according to a fourth aspect of the present invention.

Optionally, as shown in FIG. 31, the limiting groove 312 is a trapezoidal groove, the limiting groove 312 is provided with an inclined side wall, the width of the limiting groove 312 is gradually reduced from the first limiting position to the second limiting position, and in the process that the telescopic cylinder 32 moves from the first limiting position to the second limiting position, at least one end of the telescopic cylinder 32 abuts against the inclined side wall of the limiting groove 312.

As shown in FIG. 31, in the process that the telescopic cylinder 32 moves from the first limiting position to the second limiting position, since the width of the limiting groove 312 is reduced, the telescopic cylinder 32 is compressed, the telescopic cylinder 32 applies pressure to the side wall of the limiting groove 312, and the pressure is converted into a resistance opposite to the tension, thereby achieving a damping effect.

In particular, as shown in FIG. 31, a contact piece 321 is arranged at at least one end of the telescopic cylinder 32, and the telescopic cylinder 32 abuts against the limiting groove 312 through the contact piece 321.

As shown in FIG. 31, the contact pieces 321 are each of a sleeve structure and sleeve two ends of the telescopic cylinder 32. The contact piece 321 is optionally a plastic piece, so that the contact area between the telescopic cylinder 32 and the limiting groove 312 can be increased, the durability of the telescopic cylinder 32 (air cylinder) can be improved, and damage of a piston can be avoided.

In particular, the contact piece 321 is provided with a ball, and the telescopic cylinder 32 abuts against the limiting groove 312 through the ball.

The ball is clamped in the contact piece 321, and the ball and the contact piece 321 can slide relative to each other.

According to the embodiment of the present invention, by the adoption of the ball, the friction between the contact piece and the limiting groove is reduced, the durability of the contact piece is improved, and the sliding smoothness of the telescopic cylinder is also improved.

Optionally, as shown in FIG. 31, the damping piece further comprises a fixing sleeve 322, the fixing sleeve 322 is slidably mounted in the limiting groove 312, and the telescopic cylinder 32 is inserted into the fixing sleeve 322.

As shown in FIG. 31, the fixing sleeve 322 is of a sleeve structure with two open ends, the telescopic cylinder 32 is inserted into the fixing sleeve 322, and two ends of the telescopic cylinder 32 are located outside the fixing sleeve 322.

In particular, as shown in FIG. 32 to FIG. 33, the side of the limiting groove 312 connected to the fixing sleeve 322 is provided with a sliding groove 11, the fixing sleeve 322 is slidably clamped in the sliding groove 11, and the extending direction of the sliding groove 11 is the same as the movement direction of the telescopic cylinder 32 in the limiting piece 31.

As shown in FIG. 32 to FIG. 33, the side of the limiting groove 312 connected to the fixing sleeve 322 is provided with a recessed sliding groove 11 structure, and one side of the fixing sleeve 322 is slidably clamped in the sliding groove 11, so that the fixing sleeve 322 only can move in the extending direction of the sliding groove 11.

In particular, as shown in FIG. 31, the fixing sleeve 322 is provided with a guide column 3221, and the guide column 3221 is inserted into the guide groove 1211.

As shown in FIG. 31, the limiting groove 312 is provided with a kidney-shaped hole 3112 with the same direction as the extending direction of the sliding groove 11, and the guide column 3221 of the fixing sleeve 322 passes through the kidney-shaped hole 3112 and is inserted into the guide groove 1211. In the movement process of the damper, the kidney-shaped hole 3112 coincides with the guide groove 1211 to form a limiting hole structure.

According to the embodiment of the present invention, by the adoption of the kidney-shaped hole, in the movement process of the damper, the kidney-shaped hole cooperates with the guide groove to form the limiting hole structure, and the guide column drives the telescopic cylinder to move from the first limiting position to the second limiting position under the action of the limiting hole structure.

Figure 34:
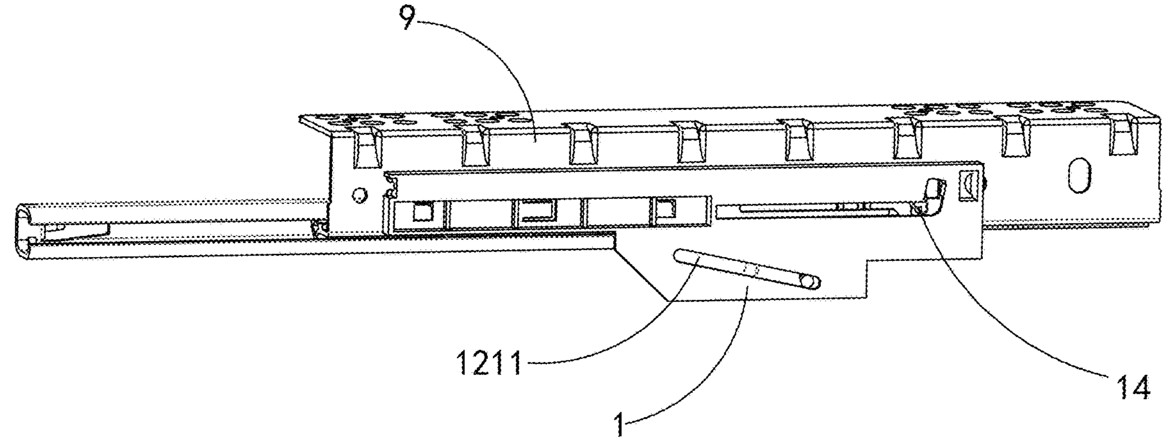
FIG. 34 is a schematic diagram of cooperation between a hidden damping structure and a telescopic rail of an embodiment according to a fourth aspect of the present invention.
Figure 35:
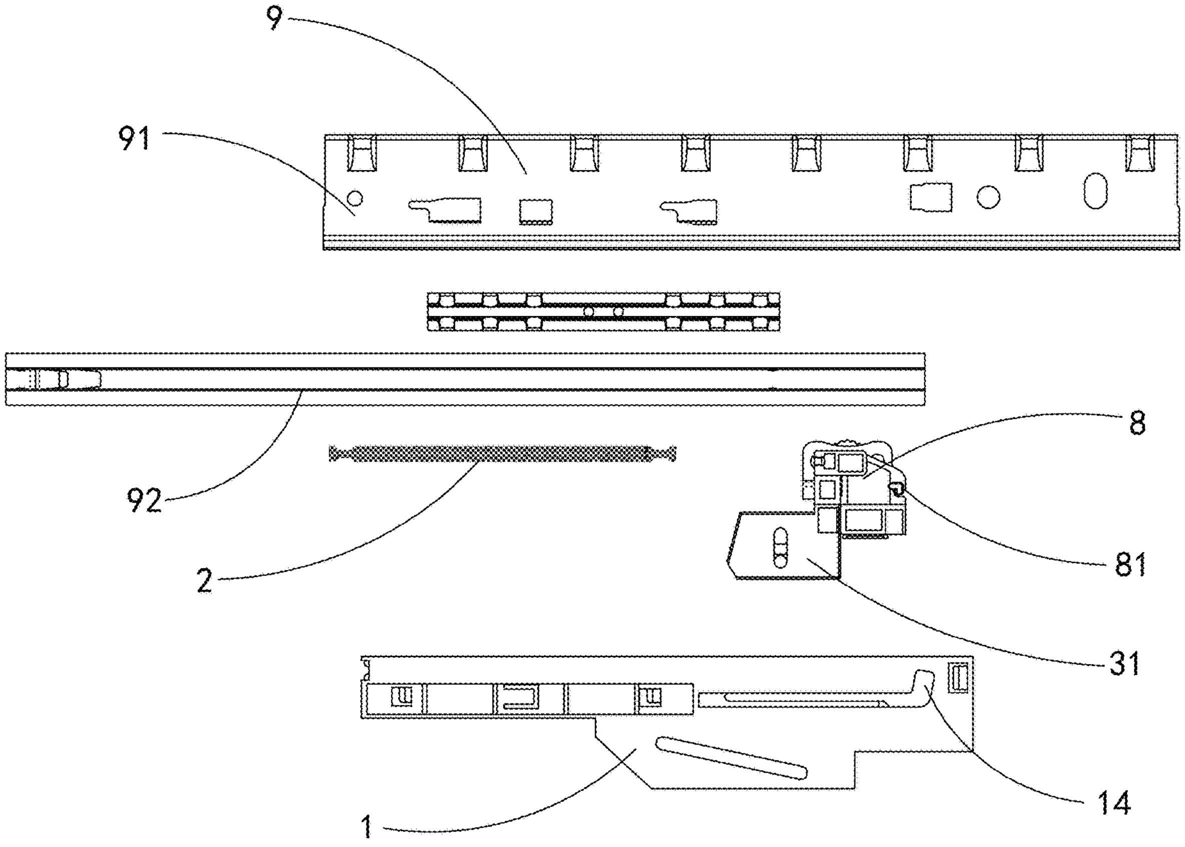
FIG. 35 is an exploded schematic diagram of cooperation between a hidden damping structure and a telescopic rail of an embodiment according to a fourth aspect of the present invention.

Optionally, the hidden damping structure provided by the present invention can cooperate with the telescopic rail 9, as shown in FIG. 34 to FIG. 35, the telescopic rail 9 comprises an outer rail 91 and an inner rail 92, the first clamping piece 82 is of a chute structure at one end of the horizontal groove 14, the second clamping piece 81 is slidably mounted in the horizontal groove 14, and when the second clamping piece 81 slides to one end of the horizontal groove 14, the second clamping piece 81 slides into the chute structure of the first clamping piece 82 through rotation, thereby realizing clamping.

Finally, it should be noted that the above embodiments are merely intended to describe the technical solutions of the present invention, rather than to limit the present invention. Although the present invention has been described in detail with reference to the above embodiments, a person of ordinary skill in the art should understand that they still can make modifications or equivalent substitutions to the specific implementations of the present invention after reading the description of the present application. However, these modifications or equivalent substitutions do not depart from the protection scope of the pending claims of the present invention.

The invention claimed is:

1. A damper assembly for sliding rails of drawers, doors or windows, comprising a shell and a damper body, wherein the damper body comprises a tension piece, a sliding block, a telescopic cylinder and a limiting piece, the sliding block is slidably mounted in the shell, and the tension piece is connected to the shell and the sliding block; the sliding block has a first position and a second position in the shell, and the tension piece is capable of pulling the sliding block to move from the first position to the second position;

the telescopic cylinder is mounted on the sliding block, and the limiting piece is mounted on the shell;

the limiting piece is provided with a compression surface, one end of the telescopic cylinder abuts against the compression surface directly, and the telescopic cylinder and the limiting piece have a first relative position and a second relative position; in a process that the tension piece pulls the sliding block to move from the first position to the second position, the telescopic cylinder moves from the first relative position to the second relative position; and in a process that the telescopic cylinder moves from the first relative position to the second relative position, the telescopic cylinder is gradually compressed;

wherein the shell is a rail; the damper body is arranged at at least one end of the rail; the sliding block is slidably mounted on the rail; the sliding block has a first position and a second position on the rail; the tension piece is capable of pulling the sliding block to move from the first position to the second position; the limiting piece is a limiting rail; the telescopic cylinder is slidably mounted on the limiting rail, and the telescopic cylinder has a first limiting position and a second limiting position on the limiting rail; the compression surface is a side wall, the limiting rail is provided with at least one compression surface forming an included angle with a direction of the rail, and the compression surface forming an included angle with the direction of the rail inclines towards the telescopic cylinder from the first limiting position to the second limiting position; in the process that the sliding block slides from the first position to the second position, the sliding block drives the telescopic cylinder to move from the first limiting position to the second limiting position; and in a movement process, one end of the telescopic cylinder abuts against the compression surface forming an included angle with the direction of the rail; and a movement direction of the telescopic cylinder relative to the limiting piece is perpendicular to a compression direction of the telescopic cylinder itself;

the limiting rail is a conical rail, and a width of the limiting rail is gradually reduced from the first limiting position to the second limiting position; and in the process that the telescopic cylinder moves from the first limiting position to the second limiting position, two ends of the telescopic cylinder abut against two side walls of the limiting rail respectively.

* * * * *